United States Patent
Zhou et al.

(10) Patent No.: US 7,570,306 B2
(45) Date of Patent: Aug. 4, 2009

(54) PRE-COMPENSATION OF HIGH FREQUENCY COMPONENT IN A VIDEO SCALER

(75) Inventors: Zhi Zhou, Corona, CA (US); Yeong-Taeg Kim, Irvine, CA (US); Surapong Lertrattanapanich, Santa Ana, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 729 days.

(21) Appl. No.: 11/236,919

(22) Filed: Sep. 27, 2005

(65) Prior Publication Data

US 2007/0070248 A1   Mar. 29, 2007

(51) Int. Cl.
*H04N 1/393* (2006.01)
*H04N 5/21* (2006.01)
*H04N 1/409* (2006.01)

(52) U.S. Cl. .................. 348/581; 348/608; 348/625; 382/298

(58) Field of Classification Search ............ 348/581, 348/607, 625, 608, 561, 704; 382/298, 275; 345/660, 472
See application file for complete search history.

(56) References Cited

U.S. PATENT DOCUMENTS 7,088,351 B2 * 8/2006 Wang .................. 345/204
7,139,036 B2 * 11/2006 Wang et al. ........... 348/625

* cited by examiner

*Primary Examiner*—David L Ometz
*Assistant Examiner*—Jean W Désir
(74) *Attorney, Agent, or Firm*—Kenneth L. Sherman, Esq.; Michael Zarrabian, Esq.; Myers Andras Sherman LLP (57) ABSTRACT

A video scaling process system, wherein the high frequency components of the input video sequence are compensated for, prior to video scaling. The video scaling system includes a pre-compensator for compensation of the high frequency components of the input video sequence, and a video scaler. The pre-compensator includes a high frequency component extractor, a noise detector and a shoot suppressor. The high frequency component extractor extracts the high frequency compensation component from an input video sequence. The noise detector adjusts the gain of the compensation to avoid the enhancement of the noise component. The shoot suppressor further adjusts the gain of the compensation to avoid shoot artifacts. The adjusted high frequency compensated video is added back to the input video. The pre-compensated video sequence is then passed through a video scaler to obtain the scaled video. As such, the sharpness of the scaled video is maintained or even enhanced.

38 Claims, 9 Drawing Sheets

PRE-COMPENSATION OF HIGH FREQUENCY COMPONENT IN A VIDEO SCALER

FIELD OF THE INVENTION

The present invention relates generally to video processing, and more particularly to video scaling in video processing.

BACKGROUND OF THE INVENTION

Figure 1:
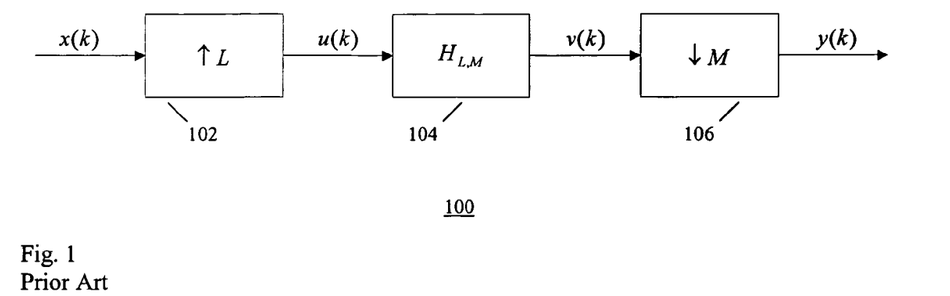
FIG. 1 shows a block diagram of a system illustrating a conventional scaling method.

In TV systems, video scaling is often required when the native resolution of an incoming video frame does not fit the display resolution. Without loss of generality, assume the scaling ratio is L/M and the greatest common divisor gcd(L, M)=1. A conventional scaling system 100 as shown in FIG. 1 is generally used to scale an input signal x(k) with an arbitrary rational scaling ratio. In that system, the input signal x(k) is up-sampled by L in an up-sampler 102, filtered by an interpolation filter 104 with frequency response $H_{L,M}$, and then down-sampled in the down-sampler 106 by M. Such process can be implemented using a polyphase structure. Using such a system, a two dimensional video frame can be first scaled in the horizontal direction with one scaling ratio and then scaled in the vertical direction with another scaling ratio, or first scaled in the vertical direction with one scaling ratio and then scaled in the horizontal direction with another scaling ratio.

In the video scaling system of FIG. 1, the up-sampling expands the time scale by a factor of L and inserts L−1 zeros between each sample of x(k), to obtain the new sequence u(k). In the frequency domain, the up-sampling introduces image components at frequency $2\pi l/L$, $1 \leq l \leq L-1$. Therefore, in order to prevent artifacts, u(k) has to be filtered by a low-pass filter with cutoff frequency $\pi/L$. On the other hand, the down-sampling takes every Mth sample of v(k) to obtain the scaled sequence y(k). However, such down-sampling generally results in aliasing.

In order to prevent aliasing, the sequence v(k) should be filtered prior to down-sampling with a low-pass filter that has a cutoff frequency $\pi/M$. The cascade of two low-pass filters with cutoff frequencies $\pi/L$ and $\pi/M$ is equivalent to a single low-pass interpolation filter $H_{L,M}$ with a cutoff frequency $\min(\pi/L, \pi/M)$. Therefore, the frequency characteristics of the interpolation filter $H_{L,M}$ depend on the values of L and M.

Because the interpolation filter $H_{L,M}$ is a low-pass filter, the scaled video lacks in high frequency components, whereby the scaled video is often blurred and not as sharp as the original input video sequence.

BRIEF SUMMARY OF THE INVENTION

In one embodiment, the present invention provides a video scaling process and system wherein the high frequency components of the input video sequence are compensated for prior to video scaling. The video scaling system comprises a high frequency component extractor, a noise detector and a shoot suppressor. The high frequency component extractor extracts the high frequency compensation component from an input video sequence. The noise detector adjusts the gain of the compensation to avoid the enhancement of the noise component. The shoot suppressor further adjusts the gain of the compensation to avoid shoot artifacts. The adjusted high frequency compensated video is added back to the input video. The pre-compensated video sequence is then passed through a video scaler to obtain the scaled video. As such, the sharpness or details of the scaled video is maintained or even enhanced.

Other embodiments, features and advantages of the present invention will be apparent from the following specification taken in conjunction with the following drawings.

DETAILED DESCRIPTION OF THE INVENTION

In one embodiment, the present invention provides a video scaling process and system wherein the high frequency components of the input video sequence are compensated for prior to video scaling. An example video scaling system according to the present invention includes a pre-compensator for compensation of the high frequency components of the input video sequence, and a video scaler.

The pre-compensator comprises a high frequency component extractor, a noise detector and a shoot suppressor. The high frequency component extractor extracts the high frequency compensation component from an input video sequence. The noise detector adjusts the gain of the compensation to avoid the enhancement of the noise component. The shoot suppressor further adjusts the gain of the compensation to avoid shoot artifacts. The adjusted high frequency compensated video is added back to the input video. The pre-compensated video sequence is then passed through a video scaler to obtain the scaled video. As such, the sharpness of the scaled video is maintained or even enhanced.

Figure 2:
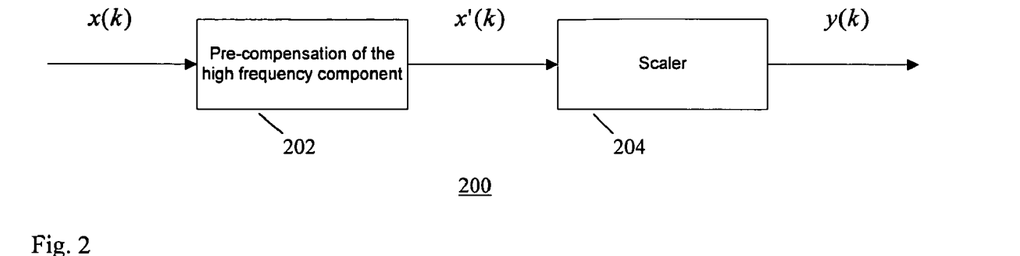
FIG. 2 shows a block diagram of an example video scaling system according to an embodiment of the present invention, providing pre-compensation of the high frequency image components of the input video signal.

FIG. 2 shows a block diagram of an embodiment of a video scaling system 200 with the pre-compensation of the high frequency components of the input signal x(k), according to an embodiment of the present invention. The system 200 includes a pre-compensator 202 for compensation of the high frequency components of the input video sequence, and a video scaler 204. The pre-compensator 202 first pre-compensates the high frequency component in the input signal x(k), and then the obtained signal x'(k) is passed through the scaler

204 to obtain the scaled signal y(k). An arbitrary scaler can be used instead of the scaler shown in FIG. 1. In addition, two one dimensional scalers 204 can be cascaded to scale a two dimensional video frame in horizontal and vertical directions, with an arbitrary order to obtain a scaled video frame. For ease of understanding in this description, the input signal x(k) can be regarded as a set of one dimensional pixel values in either horizontal or vertical direction.

Figure 3:
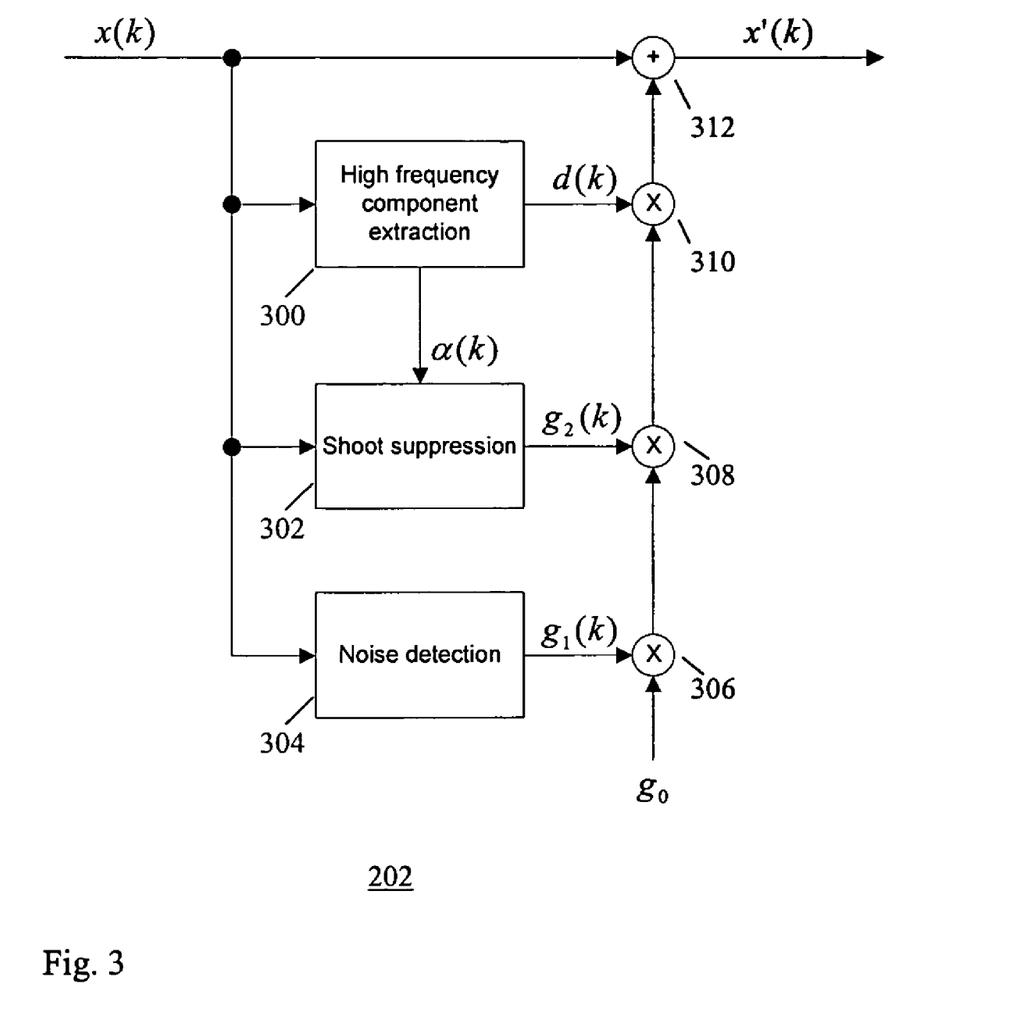
FIG. 3 shows a block diagram of an embodiment of the video pre-compensator of FIG. 2, for compensation of the high frequency component of the input video signal, according to an embodiment of the present invention.

FIG. 3 shows a block diagram of an embodiment of the video pre-compensator 202 in the system of FIG. 2, for compensation of the high frequency component of the input video signal, according to an embodiment of the present invention. The pre-compensator 202 comprises a high frequency component extractor 300, a shoot suppressor 302 and a noise detector 304. The high frequency component extractor 300 extracts the high frequency compensation component d(k) from the input signal x(k). The shoot suppressor 302 computes a suppression factor $g_2(k)$ to avoid the shoot artifacts. The noise detector 304 computes a gain adjustment parameter $g_1(k)$ based on the noise level.

In the pre-compensator 202, a pre-compensation gain $g_0$ is multiplied by the gain adjustment parameter $g_1(k)$ at a multiplier 306 to generate the product $(g_0 \cdot g_1(k))$. The product $(g_0 \cdot g_1(k))$ is further multiplied by the suppression factor $g_2(k)$ at a multiplier 308 to generate the product $(g_0 \cdot g_1(k) \cdot g_2(k))$. Then, the product $(g_0 \cdot g_1(k) \cdot g_2(k))$ is multiplied by the high frequency compensation component d(k) at the multiplier 310 to generate the product $(g_0 \cdot g_1(k) \cdot g_2(k) \cdot d(k))$. Then, the product $(g_0 \cdot g_1(k) \cdot g_2(k) \cdot d(k))$ is added to the input signal x(k) at the adder 312 to generate the pre-compensated signal x'(k) as:

$$x'(k)=x(k)+g_0 \cdot g_1(k) \cdot g_2(k) \cdot d(k).$$

Figure 4:
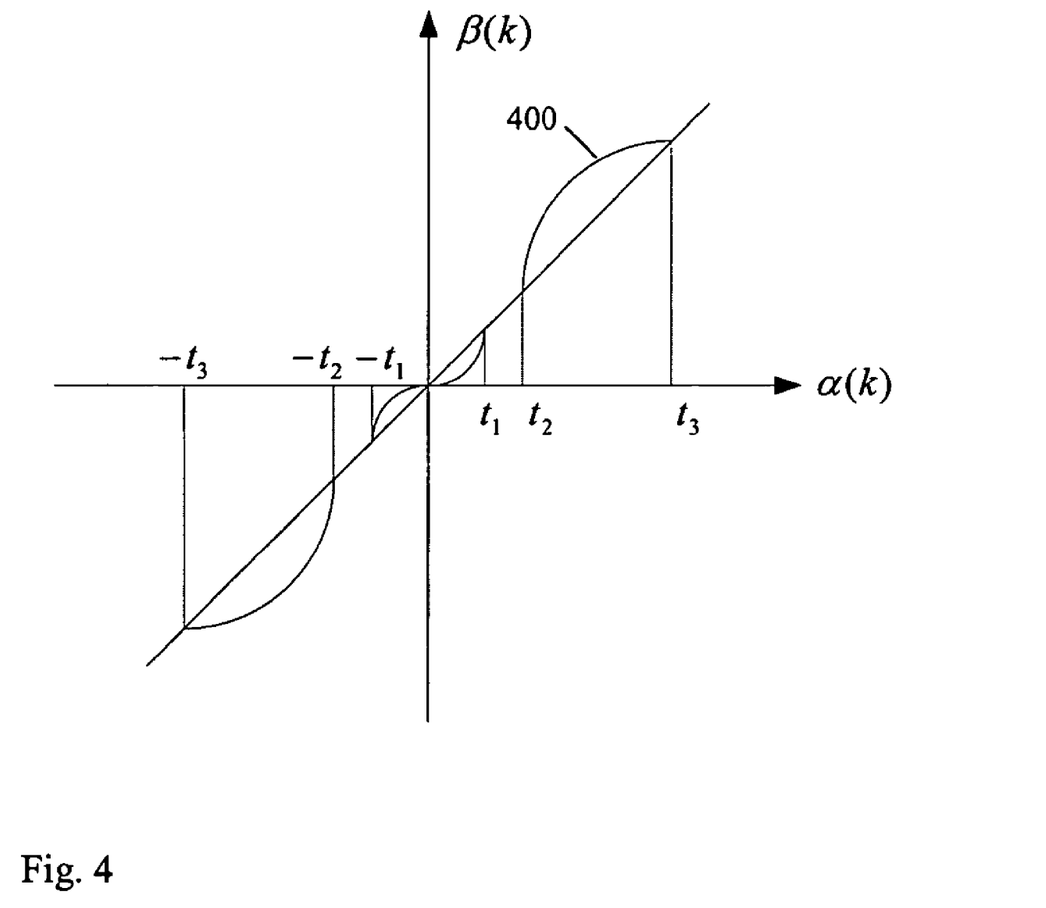
FIG. 4 shows an example of the high frequency peaking in the pre-compensation of the high frequency component of the input signal, according to an embodiment of the present invention.

In order to obtain the high frequency compensation component d(k) above, the input signal x(k) is first passed through a high-pass filter in the high frequency component extractor 300 to obtain a high frequency component α(k). For example, a high pass filter [−1,2,−1] can be used to extract α(k). Other high pass filters can also be used. FIG. 4 shows an example graph 400 of adjusting the high frequency component α(k) to output the signal β(k), where $t_1$, $t_2$ and $t_3$ are thresholds. Basically, if $0 \leq |α(k)| \leq t_1$, the amplitude of α(k) is reduced to avoid boosting up the noise, i.e.

$$\beta(k) = \alpha(k) \cdot \frac{|\alpha(k)|}{t_1}.$$

If $t_1 < |α(k)| \leq t_2$, the signal α(k) is bypassed since the compensation will not be significant in small high frequency area. If $t_2 < |α(k)| \leq t_3$, then the amplitude of α(k) is enlarged to obtain a significant compensation, i.e. $\beta(k)=\text{sign}(\alpha(k)) \cdot (t_2 + \sqrt{(|\alpha(k)|-t_2)(t_3-t_2)})$, where sign(·) denotes the sign function. If $|α(k)| > t_3$, then the signal α(k) is bypassed to avoid the overcompensation. The thresholds $t_1$, $t_2$ and $t_3$ satisfy $0 \leq t_1 \leq t_2 \leq t_3$, which can be either manually preset or dynamically calculated.

Figure 5:
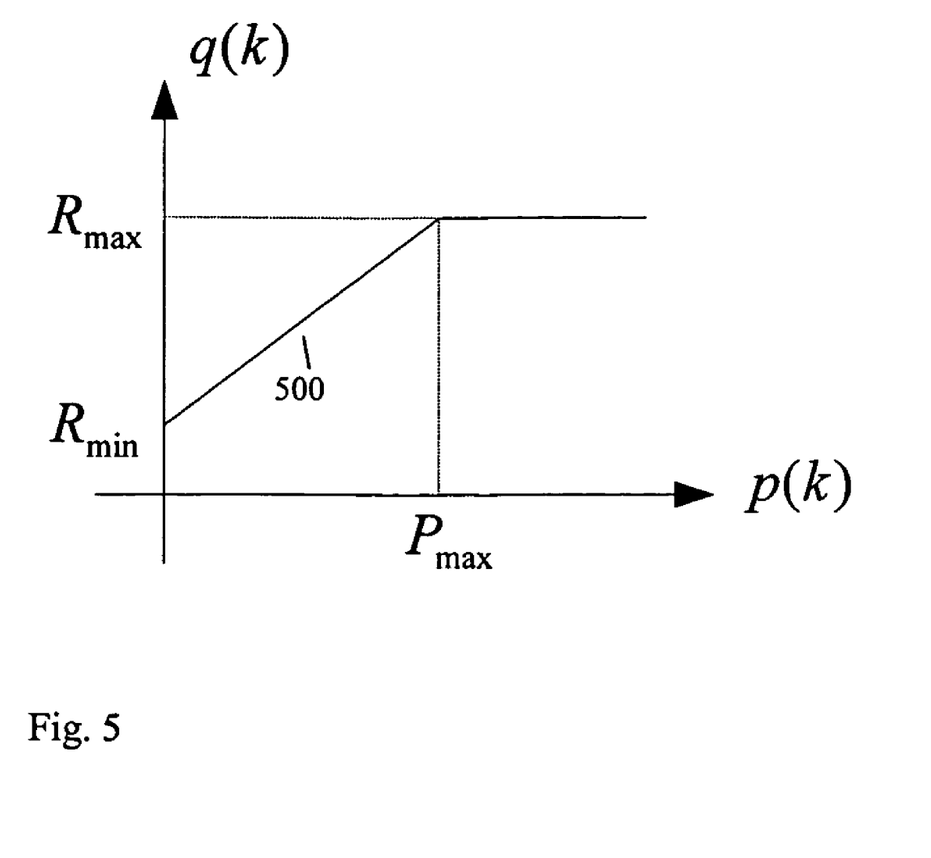
FIG. 5 shows an example of adjusting the high frequency component α(k), according to an embodiment of the present invention.

An example of dynamically calculating the thresholds $t_1$, $t_2$ and $t_3$ is now described. A signal p(k) is calculated as $p(k)=|α(k)-\bar{x}(k)|$, where $\bar{x}(k)$ is the local mean of the signal x(k). FIG. 5 shows an example graph 500 of adjusting the signal p(k) to output the signal q(k), where $P_{max}$, $R_{min}$ and $R_{max}$ are pre-defined values. Basically, if p(k)=0, then let $q(k)=R_{min}$. If $p(k) \geq P_{max}$, then let $q(k)=R_{max}$. And, if $0<p(k)<P_{max}$, then q(k) is linearly interpolated. The thresholds $t_1$ and $t_2$ are calculated as $t_1=t_2=\min(T,q(k))$, where T is a constant value that can be manually set. The threshold $t_3$ is calculated as $t_3=q(k)$.

Once the signal β(k) is obtained, the high frequency compensation component d(k) thus can be calculated as:

$$d(k)=\beta(k)-\alpha(k).$$

Referring back to FIG. 3, the noise detector 304 is used to scale down the high frequency compensation where local standard deviation (or variance) is detected as low. Low local standard deviation often indicates a relatively flat area. Without scaling down the compensation in such area, noise may be boosted up.

Figure 6:
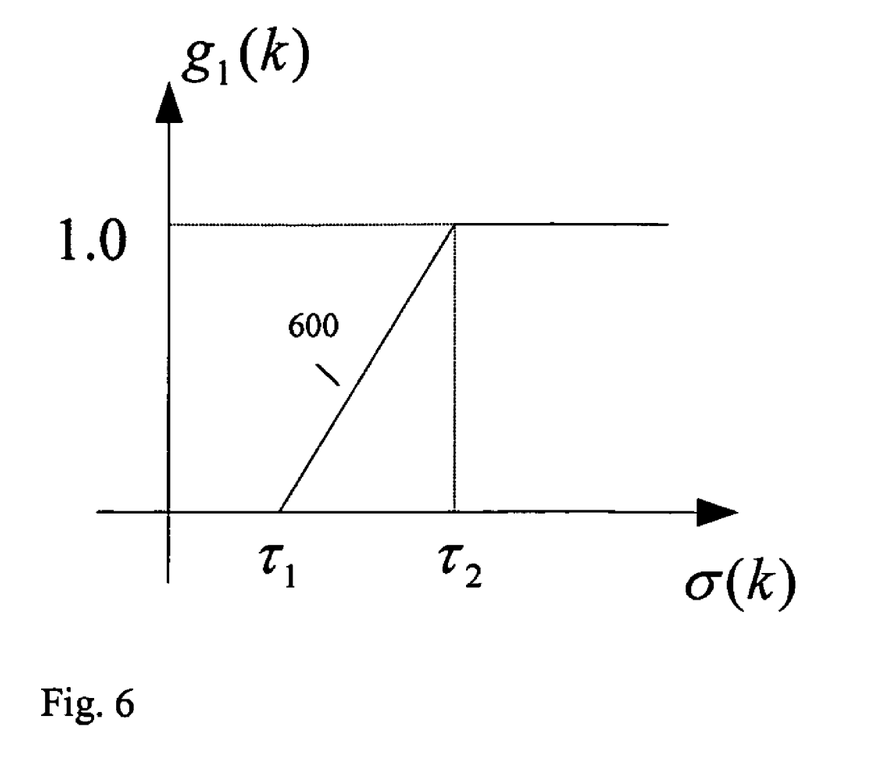
FIG. 6 shows an example of adjusting the signal p(k), according to an embodiment of the present invention.
Figure 7A:
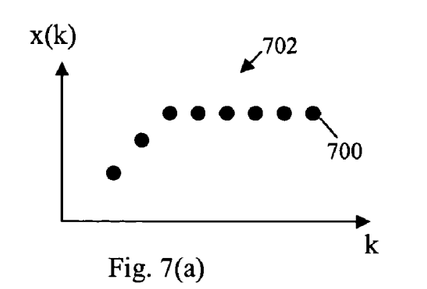
FIGS. 7(a)-(d) show four examples of luminance pattern where shoot artifacts may occur at the boundary between flat area and increasing or decreasing area during the pre-compensation of the high frequency component.
Figure 7B:
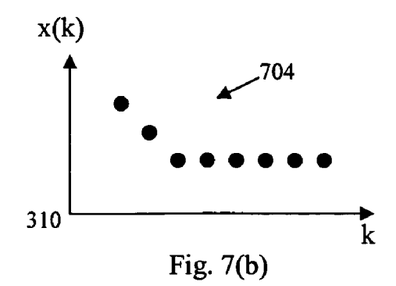
Figure 7C:
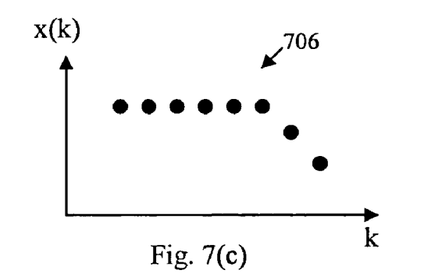
Figure 7D:
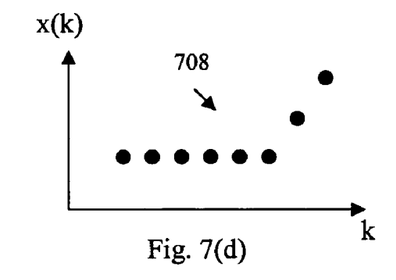

In a two dimensional video frame, the local standard deviation σ(k) is often calculated based on a rectangular neighboring window centered at the current pixel. Other methods can also be used to calculate the local standard deviation. The gain adjustment parameter $g_1(k)$ is a monotonically increasing function of the local standard deviation. FIG. 6 shows an example monotonically increasing function 600 wherein if the local standard deviation σ(k) is less than a threshold $\tau_1$, then the input signal x(k) is in the flat area and the adjustment parameter is set as $g_1(k)=0$. If σ(k) is greater than a threshold $\tau_2$ ($\tau_2 \geq \tau_1$), then the input signal x(k) contains useful edge information and the adjustment parameter is set as $g_1(k)=1$ to fully compensate the high frequency component. If $\tau_1 \leq \sigma(k) \leq \tau_2$, then the adjustment parameter $g_1(k)$ is linearly interpolated in a soft-switching manner as shown by example in FIG. 6. Specifically, if we consider linear soft-switching for instance, it can be $$g(k) = \frac{\sigma(k) - \tau_1}{\tau_2 - \tau_1}, \text{ for } \tau_1 \leq \sigma(k) \leq \tau_2.$$

The thresholds $\tau_1$ and $\tau_2$ can be set to constant values or dynamically adjusted based on noise estimation value. When the noise estimation value is high and the video sequence is considered noisy, then $\tau_1$ and $\tau_2$ should also be set to relatively large values. When the noise estimation value is low and the video sequence is considered clean, then $\tau_1$ and $\tau_2$ could be set to relatively small values so that the fine details in the video frame can be better pre-compensated. The relation between noise detection thresholds $\tau_1$, $\tau_2$ and the noise estimation value $\sigma_e$ can be expressed as:

$$\tau_1=c_1 * \sigma_e,$$

$$\tau_2=c_2 * \sigma_e,$$

where $c_1$ and $c_2$ are two pre-defined values satisfying $c_2 \geq c_1 \geq 0$. The noise estimation value $\sigma_e$ can be obtained by the method described in commonly assigned patent application Ser. No. 10/991,265, titled "Methods to estimate noise variance from a video sequence", filed on Nov. 17, 2004, which is incorporated herein by reference. The inventors have further noted that the pre-compensation in horizontal and vertical directions can share the same noise detector to save the computational cost.

In the pre-compensation of the high frequency components, shoot artifacts usually occur around edge areas. More specifically, shoot artifacts usually occur around a sharp turning point of pixel luminance that is transitioning from a relatively smooth area. FIGS. 7(a)-(d) show four example luminance patterns 702, 704, 706 and 708, respectively, where shoot artifacts may occur during the pre-compensation of the high frequency component. In each pattern, eight pixels 700 (•) are shown for illustration purposes. The number of pixels 700 actually involved can vary depending on the number of filter taps of the high pass filter in high frequency component extractor 300 (FIG. 3). It can be seen that one commonality among the four patterns in FIGS. 7(a)-(d) is that they all contain a transitioning area and a large flat area in terms of pixel luminance level.

Based on the above analysis, the shoot suppressor 302 (FIG. 3) further implements symmetry checking and intensity checking. For symmetry checking, the shoot suppressor 302 checks the luminance variation of pixels on both sides of the current pixel within the filtering range. Based on the checking result, different patterns of luminance variation in the neighborhood of the current pixel can be categorized. Therefore, higher suppression can be assigned to those patterns that are more likely to cause overshoot/undershoot. For intensity checking, the shoot suppressor 302 checks the magnitude of the high frequency component $\alpha(k)$. If $\alpha(k)$ is small, it is unlikely for obvious shoot artifacts to appear at that position. Therefore, suppression can be associated with the intensity of $\alpha(k)$ at each pixel position.

The goal of the symmetry checking is to detect the patterns shown in FIGS. 7(a)-(d). Within the filtering range, if the pixel luminance curve is close to any pattern in FIGS. 7(a)-(d), then the pre-compensation at that position should be suppressed. Let N be the value such that (2*N+1) is the length of the high pass filter in the high frequency component extractor 300. In order to check the symmetry of pixel luminance curve with reference to the position of x(k) and calculate a symmetric factor s(k), the two values $M_l$ and $M_r$ are first calculated as follows:

$$M_l = \max(d_{0,-N}, d_{0,-N+1}, \ldots, d_{0,-1}),$$

$$M_r = \max(d_{N,0}, d_{N-1,0}, \ldots, d_{1,0}),$$

where $d_{i,j}$ represents the absolute difference between x(k+i) and x(k+j) as $$d_{i,j} = |x(k+i) - x(k+j)|.$$

The value $M_l$ is the maximum absolute difference between x(k) and any pixel on its left side within the filtering range. Likewise, the value $M_r$ is the maximum absolute difference between x(k) and any pixel on its right side within the filtering range. If both values $M_l$ and $M_r$ are equal to zero, then x(k) is in a flat area. In this case, the symmetry factor s(k) is set to 1 indicating no suppression is necessary because the high frequency compensation component d(k) would be zero. If one and only one of $M_l$ and $M_r$ is equal to zero, then the pixel luminance pattern is close to one of those shown in FIGS. 7(a)-(d). Therefore, it is very likely for shoot artifacts to appear at such position. In this case, the symmetry factor s(k) is set to 0 to fully suppress the gain of the pre-compensation. If neither of $M_l$ and $M_r$ is equal to zero, then two more values, $A_l$ and $A_r$, are calculated as:

$$A_l = \frac{1}{N} \sum_{i=0}^{N-1} d_{0,-N+i},$$

$$A_r = \frac{1}{N} \sum_{i=0}^{N-1} d_{N-i,0},$$

where $A_l$ is the average of the absolute difference values on the left side of x(k), and $A_r$ is the average of the absolute difference values on the right side of x(k). The symmetry factor s(k) can then be calculated as:

$$s(k) = \begin{cases} A_l/M_r & \text{If } M_r \geq M_l \\ A_r/M_l & \text{Otherwise} \end{cases}.$$

Similarly, a more strict condition can also be used to calculate the symmetry factor s(k) as:

$$s(k) = \begin{cases} m_l/M_r & \text{If } M_r \geq M_l \\ m_r/M_l & \text{Otherwise} \end{cases},$$

where $m_l$ is the minimum of the absolute difference values on the left side of x(k), and $m_r$ is the minimum of the absolute difference values on the right side of x(k), wherein:

$$m_l = \min(d_{0,-N}, d_{0,-N+1}, \ldots, d_{0,-1}),$$

$$m_r = \min(d_{N,0}, d_{N-1,0}, \ldots, d_{1,0}).$$

Figure 8:
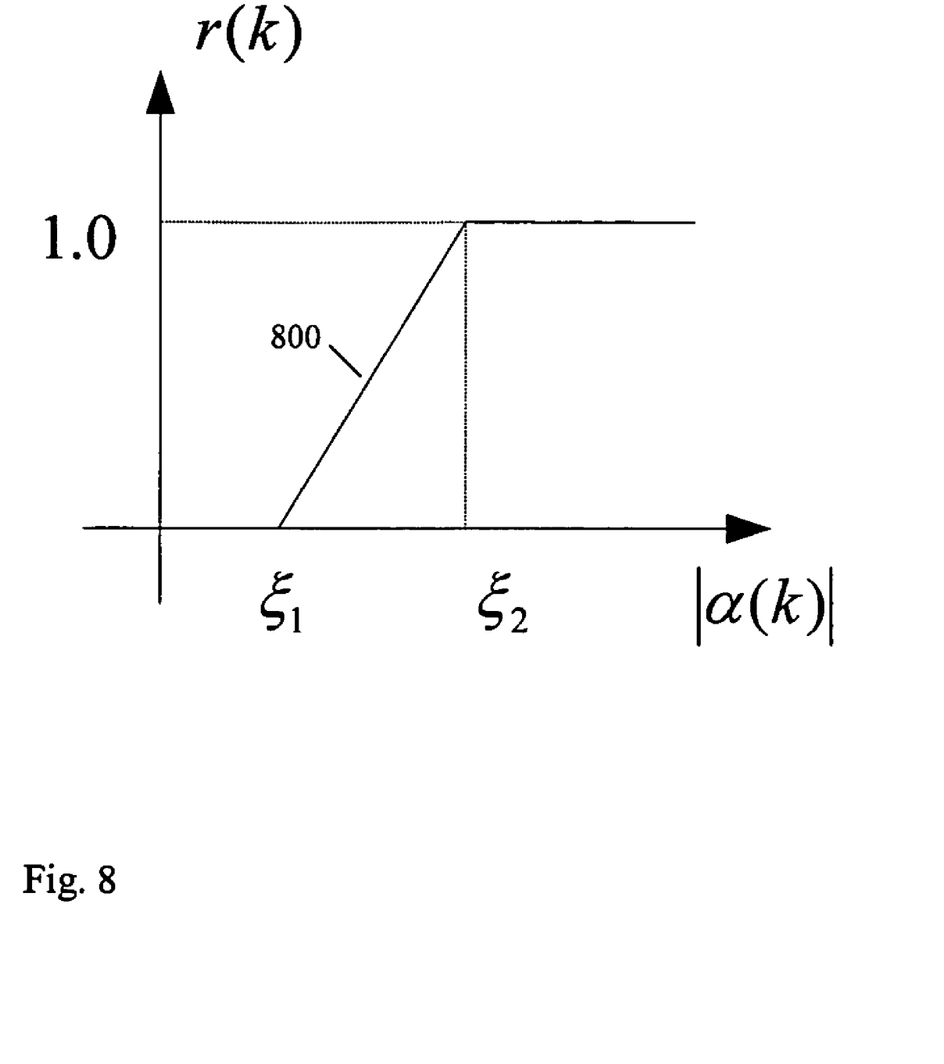
FIG. 8 shows an example of determining the intensity factor r(k) from the high frequency component α(k), according to an embodiment of the present invention.

In intensity checking, an intensity factor r(k) is computed as a monotonically increasing function of the absolute value of the high frequency component $\alpha(k)$. FIG. 8 shows an example monotonically increasing function 800 where if $|\alpha(k)|$ is less than a threshold $\xi_1$, then the intensity r(k) is set to 0. If $|\alpha(k)|$ is greater than a threshold $\xi_2$, then the intensity factor r(k) is set to 1. And, if $\xi_1 \leq |\alpha(k)| \leq \xi_2$, then the intensity factor r(k) is linearly interpolated in a soft-switching manner. The thresholds $\xi_1$ and $\xi_2$ are pre-defined values satisfying $0 \leq \xi_1 \leq \xi_2$.

With both the symmetry factor s(k) and the intensity factor r(k) obtained, the suppression factor $g_2(k)$ can be calculated as:

$$g_2(k) = 1 - (1 - s(k))*r(k).$$

When r(k)=1, the high frequency component $\alpha(k)$ is strong, wherein $g_2(k) = s(k)$. Therefore, shoot suppression is performed solely based on the symmetry factor s(k). When r(k)=0, the high pass filter output $\alpha(k)$ is considered very weak and the suppression factor $g_2(k)$ takes a value of 1, which means that no suppression is applied.

Figure 9:
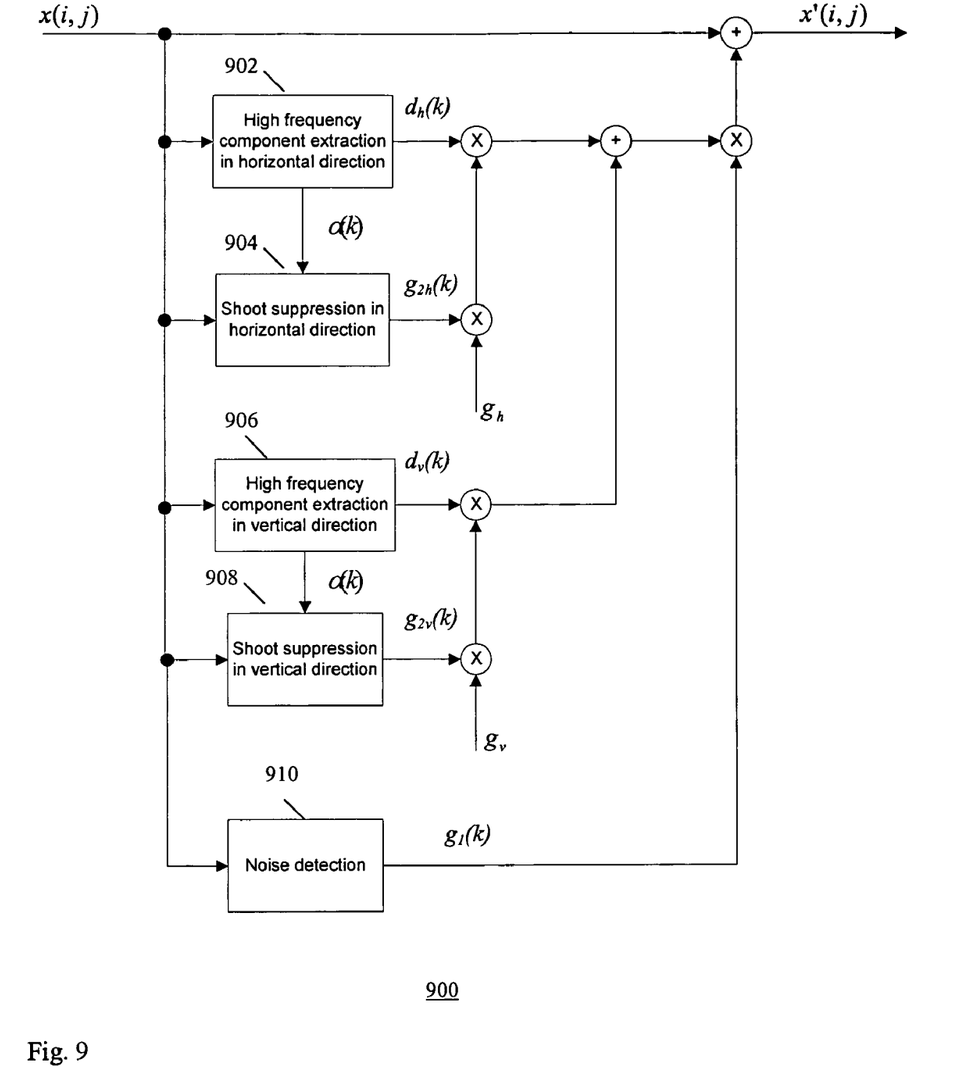
FIG. 9 shows an example of a parallel pre-compensation system to compensate the high frequency component prior to the video scaler of FIG. 1, according to another embodiment of the present invention.

The pre-compensation of the high frequency component in a video frame can also be implemented in a pre-compensation parallel structure 900 as shown in FIG. 9, where x(i,j) denotes the input two dimensional video frame signal and x'(i,j) denotes the pre-compensated video frame signal and (i,j) denotes the geometric position. The system 900 comprises a high frequency component extractor 902 for the horizontal direction, a shoot suppressor 904 for the horizontal direction, a high frequency component extractor 906 for the vertical direction, a shoot suppressor 908 for the vertical direction, and a noise detector 910.

First, the system 900 extracts the high frequency component in the horizontal direction (using exactor 902) and in the vertical direction (using exactor 906). The gain of each component (i.e., horizontal and vertical high frequency components) is then adjusted by the corresponding shoot suppressor in the either horizontal direction (using suppressor 904) or the vertical direction (using suppressor 908). Specifically, for the horizontal direction, the suppression factor $g_{2h}(k)$ output from the suppressor 904 is multiplied by gain $g_h$, and the product $(g_h \cdot g_{2h}(k))$ is further multiplied by the compensation component $d_h(k)$ output from the extractor 902 to generate the product $(g_h \cdot d_h(k) \cdot g_{2h}(k))$.

For the vertical direction, the suppression factor $g_{2v}(k)$ output from the suppressor 908 is multiplied by gain $g_v$, and the product $(g_v \cdot g_{2v}(k))$ is further multiplied by the compensation component $d_v(k)$ output from the extractor 906 to generate the product $(g_v \cdot d_v(k) \cdot g_{2v}(k))$. The products $(g_h \cdot d_h(k) \cdot g_{2h}(k))$ and $(g_v \cdot d_v(k) \cdot g_{2v}, (k))$ are added and further adjusted by the gain adjustment parameter $g_1(k)$ from the noise detector 910 to obtain a compensation component $[g_1(k) \cdot (g_h \cdot d_h(k) \cdot g_{2h}(k)) + (g_v \cdot d_v(k) \cdot g_{2v}(k))]$. The obtained compensation component is then added to the original video frame $x(i,j)$ to obtain a pre-compensated video frame $x'(i,j)$ as:

$$x'(i,j) = [g_1(k) \cdot (g_v \cdot d_v(k) \cdot g_2 v(k)) + (g_v \cdot d_v(k) \cdot g_2 v(k))] + x(i,j).$$

The pre-compensated video frame $x'(i,j)$ can be fed into a traditional video scaler or any other video scaler to obtain the scaled video, as shown in FIG. 2.

The present invention has been described in considerable detail with reference to certain preferred versions thereof; however, other versions are possible. Therefore, the spirit and scope of the appended claims should not be limited to the description of the preferred versions contained herein.

What is claimed is:

1. A video scaling method, comprising:
   pre-compensating high frequency components of an input video signal before video scaling, the pre-compensating comprising:
   determining a high frequency compensation component as a function of a high frequency component;
   performing high frequency component extraction to extract the high frequency compensation component from the input signal; and
   performing shoot suppression by:
   performing symmetry checking of pixels on both sides of a current pixel in the filtering frame; and
   based on the checking result, performing higher suppression on the high frequency compensation component for patterns that are more likely to cause overshoot or undershoot.

2. The method of claim 1 wherein the pre-compensating includes:
   determining a shoot suppression factor for adjusting the gain of the compensation to avoid shoot artifacts.

3. The method of claim 2 wherein the pre-compensating includes:
   determining a gain adjustment factor for adjusting the gain of the compensation to avoid enhancement of the noise component.

4. The method of claim 3 wherein the pre-compensating includes:
   applying the shoot suppression factor and the gain adjustment factor to the high frequency compensation component to generate a compensation factor.

5. The method of claim 4 further comprising combining the compensation factor with the input signal to generate a pre-compensated signal.

6. The method of claim 5 further comprising scaling the pre-compensated signal to obtain a scaled signal, whereby sharpness of the scaled signal is maintained.

7. The method of claim 1 wherein the step of performing high frequency component extraction to extract the high frequency compensation component from the input signal, includes:
   passing the input signal through a high-pass filter to obtain a high frequency component $\alpha(k)$; and
   determining the high frequency compensation component as a function of the high frequency component $\alpha(k)$.

8. The method of claim 7 wherein the determining the high frequency compensation component as a function of the high frequency component $\alpha(k)$, further includes adjusting high frequency component $\alpha(k)$ such that:

if $0 \leq |\alpha(k)| \leq t_1$, then amplitude of $\alpha(k)$ is reduced to avoid boosting noise;

if $t_1 < |\alpha(k)| \leq t_2$, then $\alpha(k)$ is bypassed;

if $t_2 < |\alpha(k)| \leq t_3$, then $\alpha(k)$ is increased; and if $|\alpha(k)| > t_3$, then $\alpha(k)$ is bypassed to avoid overcompensation;

wherein the thresholds $t_1$, $t_2$ and $t_3$ satisfy $0 \leq t_1 \leq t_2 \leq t_3$.

9. The method of claim 8, wherein reducing amplitude of $\alpha(k)$ includes multiplying $\alpha(k)$ by an adjustment factor to generate the signal $\beta(k)$ as:

$$\beta(k) = \alpha(k) \cdot \frac{|\alpha(k)|}{t_1}.$$

10. The method of claim 8 wherein the determining the high frequency compensation component $d(k)$ further includes determining $d(k) = \beta(k) - \alpha(k)$, wherein $\beta(k)$ is a function of $\alpha(k)$.

11. The method of claim 8, wherein increasing amplitude of $\alpha(k)$ includes applying an adjustment factor to $\alpha(k)$ generate the signal $\beta(k)$ as:

$$\beta(k) = \text{sign}(\alpha(k)) \cdot (t_2 + \sqrt{(|\alpha(k)| - t_2)(t_3 - t_2)}),$$

wherein $\text{sign}(\cdot)$ denotes the sign function.

12. The method of claim 11 wherein the determining the high frequency compensation component $d(k)$ further includes determining $d(k) = \beta(k) - \alpha(k)$, wherein $\beta(k)$ is a function of $\alpha(k)$.

13. The method of claim 3 wherein the gain adjustment factor is a monotonically increasing function of the local standard deviation.

14. The method of claim 1 wherein:
   the performing symmetry checking includes checking luminance variation of pixels on both sides of the current pixel within the filtering range.

15. The method of claim 14 wherein the performing shoot suppression further includes:
   performing intensity checking by checking magnitude of the high frequency component, and
   performing suppression as a function of the intensity of the high frequency component at each input signal pixel position.

16. The method of claim 1 wherein the input signal comprises a two dimensional array of pixels, such that the pre-compensation of the high frequency components of the input signal is performed in the horizontal direction to determine a horizontal compensation factor, and in the vertical direction to determine a vertical compensation factor.

17. The method of claim 16 further comprising combining the horizontal and vertical compensation factors with the input signal to generate a pre-compensated signal.

18. A video scaling system for scaling of an input video signal, comprising:
   a pre-compensator that pre-compensates for the high frequency components of the input video signal to generate a pre-compensated signal prior to video scaling, the pre-compensator comprises:

an extractor that performs high frequency component extraction to extract a high frequency compensation component from the input signal by filtering the input signal and determines the high frequency compensation component as a function of the high frequency component; and a shoot suppressor configured to perform symmetry checking by checking pixels on both sides of a current pixel within the filtering range; and based on the checking result, performing higher suppression on the high frequency compensation component for patterns that are more likely to cause overshoot or undershoot.

19. The system of claim 18 wherein the pre-compensator further comprises a shoot suppressor that determines a shoot suppression factor for adjusting the gain of the compensation to avoid shoot artifacts.

20. The system of claim 19 wherein the pre-compensator further comprises a noise detector that determines a gain adjustment factor for adjusting the gain of the compensation to avoid enhancement of the noise component.

21. The system of claim 20 wherein the pre-compensator further applies the shoot suppression factor and the gain adjustment factor to the high frequency compensation component to generate a compensation factor.

22. The system of claim 21 wherein the pre-compensator further combines the compensation factor with the input signal to generate the pre-compensated signal.

23. The system of claim 22 further comprising a scaler that scales the pre-compensated signal to obtain a scaled signal, whereby sharpness of the scaled signal is maintained.

24. The system of claim 18 wherein:
the extractor performs high frequency component extraction to extract a high frequency compensation component from the input signal by passing the input signal through a high-pass filter to obtain a high frequency component $\alpha(k)$; and
the pre-compensator further determines the high frequency compensation component as a function of the high frequency component $\alpha(k)$.

25. The system of claim 24 wherein the pre-compensator determines the high frequency compensation component as a function of the high frequency component $\alpha(k)$ by adjusting high frequency component $\alpha(k)$ such that:

if $0 \leq |\alpha(k)| \leq t_1$, then amplitude of $\alpha(k)$ is reduced to avoid boosting noise;

if $t_1 < |\alpha(k)| \leq t_2$, then $\alpha(k)$ is bypassed;

if $t_2 < |\alpha(k)| \leq t_3$, then $\alpha(k)$ is increased; and if $|\alpha(k)| > t_3$, then $\alpha(k)$ is bypassed to avoid overcompensation;

wherein the thresholds $t_1$, $t_2$ and $t_3$ satisfy $0 \leq t_1 \leq t_2 \leq t_3$.

26. The system of claim 25 wherein the pre-compensator reduces the amplitude of $\alpha(k)$ by multiplying $\alpha(k)$ by an adjustment factor to generate the signal $\beta(k)$ as:

$$\beta(k) = \alpha(k) \cdot \frac{|\alpha(k)|}{t_1}.$$

27. The system of claim 25 wherein the pre-compensator determines the high frequency compensation component d(k) by determining $d(k) = \beta(k) - \alpha(k)$, wherein $\beta(k)$ is a function of $\alpha(k)$.

28. The system of claim 25 wherein the pre-compensator increases the amplitude of $\alpha(k)$ by applying an adjustment factor to $\alpha(k)$ generate the signal $\beta(k)$ as:

$$\beta(k) = \text{sign}(\alpha(k)) \cdot (t_2 + \sqrt{(|\alpha(k)| - t_2)(t_3 - t_2)}),$$

wherein $\text{sign}(\cdot)$ denotes the sign function.

29. The system of claim 28 wherein the pre-compensator determines the high frequency compensation component d(k) by determining $d(k) = \beta(k) - \alpha(k)$, wherein $\beta(k)$ is a function of $\alpha(k)$.

30. The system of claim 20 wherein the gain adjustment factor is a monotonically increasing function of the local standard deviation.

31. The system of claim 29 wherein the shoot suppressor performs shoot suppression further by:
performing symmetry checking by checking the luminance variation of pixels on both sides of the current pixel within the filtering range; and
based on the checking result, performing higher suppression for patterns that are more likely to cause overshoot or undershoot.

32. The system of claim 31 wherein the shoot suppressor performs shoot suppression further by:
performing intensity checking by checking the magnitude of the high frequency component $\alpha(k)$,
performing suppression as a function of the intensity of $\alpha(k)$ at each input signal pixel position.

33. The system of claim 18 wherein the input signal comprises a two dimensional array of pixels, such that the pre-compensation of the high frequency components of the input signal is performed in the horizontal direction to determine a horizontal compensation factor, and in the vertical direction to determine a vertical compensation factor.

34. The system of claim 33 wherein the pre-compensator further combines the horizontal and vertical compensation factors with the input signal to generate the pre-compensated signal.

35. The system of claim 18, wherein the pre-compensator performs cascade pre-compensation.

36. The system of claim 18, wherein the pre-compensator performs parallel pre-compensation.

37. A video scaling method, comprising:
pre-compensating high frequency components of an input video signal before video scaling; said pre-compensating includes:
performing high frequency component extraction to extract a high frequency compensation component from the input signal;
determining a shoot suppression factor for adjusting gain of the compensation to avoid shoot artifacts; and
determining a gain adjustment factor for adjusting gain of the compensation to avoid enhancement of a noise component,
wherein the gain adjustment factor is a monotonically increasing function of the local standard deviation.

38. A video scaling system for scaling of an input video signal, comprising:
a pre-compensator that pre-compensates for the high frequency components of the input video signal to generate a pre-compensated signal prior to video scaling, the pre-compensator comprises:

an extractor that performs high frequency component extraction to extract a high frequency compensation component from the input signal;

a shoot suppressor that determines a shoot suppression factor for adjusting the gain of the compensation to avoid shoot artifacts; and a noise detector that determines a gain adjustment factor for adjusting the gain of the compensation to avoid enhancement of the noise component, wherein the gain adjustment factor is a monotonically increasing function of the local standard deviation.

* * * * *